(12) United States Patent
Chandrasekaran et al.

(10) Patent No.: US 11,412,758 B2
(45) Date of Patent: Aug. 16, 2022

(54) LOW SATURATED FAT DIPPING COATING FOR FROZEN CONFECTION

(71) Applicant: NESTEC S.A., Vevey (CH)

(72) Inventors: Shantha Nalur Chandrasekaran, Bakersfield, CA (US); Maria Fernanda Villacis, York Yorkshire (GB); Olga Smirnova, York Yorkshire (GB); Christel Webering, York Yorkshire (GB)

(73) Assignee: Societe des Produits Nestle S.A., Vevey (CH)

( * ) Notice: Subject to any disclaimer, the term of this patent is extended or adjusted under 35 U.S.C. 154(b) by 495 days.

(21) Appl. No.: 15/778,830

(22) PCT Filed: Nov. 15, 2016

(86) PCT No.: PCT/EP2016/077633
§ 371 (c)(1),
(2) Date: May 24, 2018

(87) PCT Pub. No.: WO2017/089166
PCT Pub. Date: Jun. 1, 2017

(65) Prior Publication Data
US 2019/0387769 A1    Dec. 26, 2019

(30) Foreign Application Priority Data
Nov. 27, 2015  (EP) ..................... 15196796

(51) Int. Cl.
*A23G 9/32*  (2006.01)
*A23D 9/007*  (2006.01)

(52) U.S. Cl.
CPC ............. *A23G 9/322* (2013.01); *A23D 9/007* (2013.01); *A23G 9/327* (2013.01); *A23G 2200/08* (2013.01)

(58) Field of Classification Search
CPC .... A23G 9/322; A23G 9/327; A23G 2200/08; A23D 9/007
(Continued)

(56) References Cited

U.S. PATENT DOCUMENTS

2008/0131564 A1* 6/2008 Nalur .................. A23G 9/322
426/93

FOREIGN PATENT DOCUMENTS

CN        1140549 A      1/1997
CN      104602547 A      5/2015
(Continued)

OTHER PUBLICATIONS

Kallio, H. et al. J. Agric. Food Chem. 49: 3363-3369 (2001) (Year: 2001).*

(Continued)

*Primary Examiner* — Hamid R Badr
(74) *Attorney, Agent, or Firm* — K&L Gates LLP (57) ABSTRACT

The invention relates to a dipping or enrobing coating composition for coating frozen confection, comprising, expressed in weight % based on the total weight of the coating,
30-75 wt. % of a single fat, preferably 40-65 wt. %, said fat comprising the following fatty acids: 45<=C16:0<=52 wt. %, 4<=C18:0<=8 wt. %, 30<=C18:1<=40 wt. 5<=C18:2<=10 wt. %, and said fat comprising a solid fat profile comprising: 85%≤N 0<=95%; 75%<=N 10<=90%; 40%<=N 20<=60%; 18%<=N 25<=35%; 0%<=N 30<=10%; and 0%<N 35 wherein said coating having Casson yield stress of 0.05 to 0.9 Pa and a Casson plastic viscosity of the coating composition is 50 to 250 mPas. The invention also relates to the use of the mentioned fat in dipping or enrobing coating compositions, a
(Continued)

method of preparing the coating composition, and products coated with the coating composition.

20 Claims, 2 Drawing Sheets

(58) Field of Classification Search
USPC .................................................. 426/100, 101
See application file for complete search history.

(56) References Cited

FOREIGN PATENT DOCUMENTS

| | | |
|---|---|---|
| CN | 104768385 A | 7/2015 |
| EA | 024216 B1 | 8/2016 |
| EP | 0023150 | 1/1981 |
| EP | 1813155 | 8/2007 |
| EP | 2099313 | 3/2014 |
| EP | 2367441 | 7/2014 |
| WO | WO-03075672 A1 * 9/2003 ............... A23G 9/24 |
| WO | 2014016257 | 1/2014 |
| WO | 2014102634 | 7/2014 |
| WO | 2015132206 | 9/2015 |

OTHER PUBLICATIONS

Chinese Office Action for Appl No. 201680067874.6 dated May 8, 2021.
Talbot, "Technology of Enrobed and Filled Products", SPb, Professia, 496, 2011, pp. 194-195.
Russia Patent Office Action Received for Application No. 2018123142, dated Mar. 10, 2020, 8 pages.

* cited by examiner

LOW SATURATED FAT DIPPING COATING FOR FROZEN CONFECTION

CROSS REFERENCE TO RELATED APPLICATIONS

The present application is a National Stage of International Application No. PCT/EP2016/077633, filed on Nov. 15, 2016, which claims priority to European Patent Application No. 15196796.5, filed on Nov. 27, 2015, the entire contents of which are being incorporated herein by reference.

FIELD OF THE INVENTION

The present invention relates to a composition for coating a frozen confection, in particular to a low saturated fatty acid coating composition. The invention also relates to a method for coating a frozen confection.

BACKGROUND

Coated frozen confections are products which are highly appreciated by consumers. Texture and nutritional profile of the coating is driver for consumer preference.

With the increasing concern for health and wellness there is a need for reducing calories, sugars and saturated fats also in frozen confections.

Chocolate-like or compound coatings based on vegetable fats are commonly used for coating frozen confection. The crystallization of the fats in a coating are a key contributor to the physical properties of a coating, in particular its textural properties (brittleness, melting, waxyness) and setting time. Traditionally compound coatings for frozen confection have been manufactured with high proportions of lauric fats (e.g. coconut oil and palm kernel oil) which have a saturated fatty acid (SFA) level about 87-91%. With high amounts of lauric fats in the coatings, the SFA levels in the finished coating are typically between 30 and 60%.

The problem is that saturated fats may be harmful to health and therefore there is a need to reduce the saturated fats in the coating.

WO2015/045480 (Fuji Oil) discloses moisture barrier for frozen confectioneries. Said moisture barrier contains an oily composition made of fractioned palm oil. This coating is a high viscous coating with value of yield value/plastic viscosity of 10 or greater. High viscous coatings tend to flow less evenly over the product and thus can result in less even spreading of a coating over the product surface.

EP1813155 (CSM) discloses a fat based coating compositions for frozen confectioneries. The coating is based on a coconut oil and palm olein blend and has saturated fatty acids ranging between 73-86% in the fats.

WO2014/102634 (Loders Croklaan) discloses a coating for baked good with a low Saturated Fatty Acid (SFA) content. The coating disclosed have a low content in palmitic fatty acid, and high content in oleic and linoleic fatty acid. This coating will not be suitable for application on ice cream products. The fat used is a combination of palm olein and liquid oil and has less than 45% saturated fatty acids in the fat. Therefore the coating will set slowly and is highly likely to leave a smear film in the packaging. Furthermore it will deliver a rather soft eating experience.

EP2099313 (Nestec) discloses an ice confection having an ice confection core and a snappy outer compound coating layer that has a reduced saturated fatty acid content. The fat in the compound coating is a mixture of fractionated palm oil and liquid oil. This compound coating has similar textural characteristics to that of conventional products, particularly 'snappiness'. This coating provides advantages in terms of substantial SFA reduction. However it does use a combination of two fats one of which is a liquid oil and there are complexities and oxidative problems associated with the liquid oil.

EP2367441 (Unilever) discloses a composition for coating a frozen confection is provided, the composition comprising from 63 to 70 wt. % of a fat component comprising: 70 to 95 wt. % of a palm oil fraction or blend of fractions which contains at most 8 wt. % of S3 triglycerides and has a S2U:SU2 ratio of >2.5; 5 to 15% of a liquid oil; and 0 to 15% of cocoa butter. Again this is combination of fats and present similar complexities as above The prior art does not show how to further substantially reduce the SFA level in a coating composition for frozen confection using a single fat.

OBJECT OF THE INVENTION

It is thus the object of present invention to provide a reduced SFA coating for dipping, enrobing and decoration application on frozen confectionery products providing not only flavour but also textural contrast between the ice cream and the coating layer.

A second object of the present invention is to provide a coating composition for frozen confectionery with acceptable processing characteristics.

This invention has developed coatings with fat that have at least 30% less SFA than the current coating and still performs well on processing line and gives a good sensory properties.

SUMMARY OF THE INVENTION

The present invention provides a coating composition with a single fat, not blends, that have at least 30% less SFA than standard existing coatings and still performs on processing line and gives a good sensory properties.

According to a first aspect the invention relates a dipping or enrobing coating composition for coating frozen confection, comprising, expressed in weight % based on the total weight of the coating, 30-75 wt. % of a single fat, preferably 40-65 wt. %, said fat comprising the following fatty acids:
45<=C16:0<=52 wt. % (palmitic acid)
4<=C18:0<=8 wt. % (stearic acid)
30<=C18:1<=40 wt. % (oleic acid)
5<=C18:2<=10 wt. % (linoleic acid)
and said fat comprising a solid fat profile comprising:
85%<=N 0<=95%;
75%<=N 10<=90%;
40%<=N 20<=60%;
18%<=N 25<=35%;
0%<=N 30<=10%;
0%<N 35
said coating having Casson yield stress of 0.05 to 0.9 Pa and a Casson plastic viscosity of the coating composition is 50 to 250 mPas.

In a second aspect the invention relates to the use of a single fat for dipping, enrobing or decoration of frozen confection, said fat comprising the following fatty acids:
45<=C16:0<=52 wt. % (palmitic acid)
4<=C18:0<=8 wt. % (stearic acid)
30<=C18:1<=40 wt. % (oleic acid)
5<=C18:2<=10 wt. % (linoleic acid)

and said fat comprising a solid fat profile comprising:
85% N 0<=95%;
75%<=N 10<=90%;
40%<=N 20<=60%;
18%<=N 25<=35%;
0% N 30<=10%; and
0%<N 35
wherein said coating having Casson yield stress of 0.05 to 0.9 Pa and a Casson plastic viscosity of the coating composition is 50 to 250 mPas.

The invention also relates to a method for producing the coating composition as described in the claims and a product at least partly coating with the composition according to the invention.

DETAILED DESCRIPTION OF THE INVENTION

It has been found that it is possible with a single fat with a particular fatty acid profile and solid fat content a coating composition which has a yield stress and plastic viscosity which makes it suitable for coating, enrobing and decoration of frozen confection is obtained. Furthermore, this coating composition at the same time provides a healthier option than conventional coatings as the coating composition is low in SFA.

Use of a single fat in the coating gives the benefit of less complexity with respect to handling of fat, gives labelling advantage as well as helps with storage and shelf-life as no liquid oil is used, as in blends used in prior work.

In the present context a single fat is a single fat and not a blend of fats of different types of fat. The single fat is preferably palm. It may be made of one palm fraction or fractions. In a preferred embodiment of the invention the fat in the coating composition consist of the single fat and fat being an integrated part of cocoa ingredients and/or dairy ingredients.

In the present context dipping or enrobing coatings includes coatings used for decoration in particular for exterior surfaces of frozen confection. Dipping or enrobing coating does not include barrier coating for wafers.

The rheological properties in the present context the viscosity of the coating are measured with Physica MCR 501 rheometer—Anton Paar (Germany); fitted with the spindle CC27, @ 40° C., and following the International Confectionery Association, "Viscosity of Cocoa and Chocolate Products" Analytical Method 46 (2000). The results are expressed as Casson yield stress and Casson plastic viscosity. In the present context where there is referred to yield stress and plastics viscosity this means Casson yield stress and Casson plastic viscosity respectively. More precisely, the viscosity of the fats is measured using Physica MCR (rheometer model) 501-Anton Paar (Germany) system with geometry: CC27/S (Serial Number:20689) @ 40° C. and 100 s-1.

With the coating composition according to the invention it is possible to obtain a coating which has less SFA while retaining a snap property of the coating. A preferred level of SFA in the fat used in the coating is 45-55 wt. %, more preferably 48-52 wt %, of the fat.

In the present context, unless otherwise stated, the fatty acids are expressed as percentages based on total fat (g fatty acid/100 g total fat). To calculate the fatty acid content based on total fatty acids the factor 0.94 should be used (1 g fatty acid/100 g total fatty acids=0.94 g fatty acid/100 g fat).

In the present context a snap is the term used in ice cream dipping coatings to define the "crispiness" of the coating, its hardness, brittleness and sound. It is important for the coating to have a good snap as it is the first characteristics the consumers notice on an ice cream stick.

In the present context LLL, OLL, PLL, OLO, PLO, PLP, OOO, POO, and SOO; triglycerides are abbreviated using L, O, P and S, for linoleoyl, oleoyl, palmitoyl, and stearoyl fatty acid moeity, respectively.

A preferred coating composition according to the invention has a fat which further comprise the following triglyceride composition:
<0.5 wt. % LLL
<1 wt. % OLL
0-2 wt. % PLL
0-2 wt. % OOL
3-7 wt. % POL
6-15 wt. % PPL
0-4 wt. % OOO
8-17 wt. % POO+SOL
45-55 wt. % PPO
0-3 wt. % PPP
0-3 wt. % SOO
5-15 wt. % PSO
<1 wt. % PPS
0-3 wt. % SSO In a preferred embodiment of the invention the barrier coating comprises a triglyceride composition comprises 10 to 17 wt. % POO+SOL and 48 to 55 wt. %. PPO. The benefit of this coating is that while it is lower in saturates, it has triglycerides predominantly made of disaturate, monosaturate species and is low in triunsaturated species. This allows for the lower levels of SFA while still giving structuring and setting properties to the coating.

The coating rheology is key to get the right weight pick-up and uniform coverage on the bar. Too high a yield stress will cause higher weight pick-up which will further effect the setting of the coating; also an imbalance in the plastic viscosity and yield stress can cause bar coverage issue and also impair performance on the line The melting point of the coating has been found to be important, it is preferred that the coating composition has a melting point of 29 to 34° C. Above this temperature the coating will be perceived as waxy as the mouth temperature is depressed during consumption of ice cream; lower melt point will make the coating softer and lose and the desirable texture, snap, associated with eating a coated ice cream.

It has been found that in particular the solid fat profile of:
85%<=N 0<=95%;
75%<=N 10<=90%;
provides a coating with a snap when being consumed.

In another embodiment of the invention the coating composition comprises a fat not containing hydrogenated fat. Hydrogenated fats are not preferred for use in coatings since partially hydrogenated fats contain trans fat that is harmful for health. Furthermore, is preferred that the coating composition and have less than <1% trans fatty acids.

Advantageously, the coating composition according to the invention comprising palm fraction or fractions with an iodine value of 40 to 50, preferably 42 to 48. Higher iodine value results in higher unsaturation which will lower the setting of the coating; too low an iodine value can make the coating waxy.

The viscosity of the fat advantageously is 37 to 40 mPa·s measured at 40° C. This helps with the proper flow properties of the coating, thereby giving good bar coverage.

The coating composition according to the invention comprising 30 to 75 wt. % of fat, more preferably 40 to 65 wt. % of fat. This range of fat content is preferred, as it contributes to achieve appropriate viscosity (along with an optional addition of limited amount of emulsifiers) and preferred thickness of coating in frozen confections.

For optimal coating properties preferred embodiments of the coating compositions are as follows:

A coating composition comprising 35 to 48 wt. % of fat, said coating having a yield stress of 0.05 to 0.5 Pa and a viscosity of 50 to 150 mPa·s. Coatings with this properties are typically used for rather premium products with a thickness of the coating layer above 1 mm.

A coating composition comprising 48 to 58 wt. % of fat, said coating having a yield stress of 0.1 to 0.8 Pa and a viscosity of 100 to 200 mPa·s. This fat content is typical for standard products with a medium coating layer thickness (between 0.8 and 1 mm).

A coating composition comprising 58 to 70 wt. % of fat, said coating having a yield stress of 0.05 to 0.5 Pa and a viscosity of 50 to 150 mPa·s. This type of coating is used for economy style products and a desired thickness of coating layer less than 0.8 mm.

The coatings are specifically designed with different fat levels and thus different viscosities to cover different applications, dipping sticks, enrobing bon-bons etc., wherein one can modulate the coating weight to ice cream ratio to give consumers different types of products and with indulgence.

Alternatively in addition to modifying the fat content, a change of manufacturing parameters (e.g. particle size distribution) will enable to achieve the desired viscosity and yield stress. A preferred particle size is below 40 microns. A larger particle size will be perceived by consumers as gritty and unpleasant. However if there are inclusions added into the coatings, then the particle size can be increased to ~50 microns, as the inclusions will mask the grittiness.

The coating composition according to the invention may comprises 25 to 70 wt. % non-fat solids. The non-fat solids are preferably selected from the group consisting of: sugar, fibres, cocoa (mass or powder), dairy ingredients, emulsifier and one or more flavouring ingredients. The non-fat solids provide structure, flavour and colour to the coating.

In the present context the fat phase includes the fat deriving from the cocoa ingredients and dairy ingredients. The fat in these powder are calculated in to the amounts of fat in the composition.

In a preferred embodiment of the invention the coating composition comprises 18 to 60 wt. % of sugar, preferably 25-50%, 0 to 25 wt. % cocoa ingredients, preferably 0-15% and 0 to 30 wt. % of dairy ingredients, preferably 0 to 12 wt. % dairy ingredients.

Examples of dairy ingredients are whole milk powder, skimmed milk powder, and whey powder.

For chocolate flavoured coating the amounts of non-fat/low-fat cocoa solids in the coating composition is below 40 wt. %, preferably from 0 to 30 wt. %, more preferably from 3 to 20 wt. %. For milk chocolate flavoured coating it is preferred that the amount of skim milk solids for milk chocolate is below 25 wt. %, preferably from 0 to 16 wt. %. To obtain other coatings no cocoa powder might be included at all.

The fat-based coating composition may comprise 0.1 to 2 wt. % of emulsifiers. Preferably the emulsifiers are selected from the group consisting of sunflower lecithin, soya lecithin polyglycerol polyricinoleate (PGPR; E476), or ammonium phosphatide (YN; E442) or a combination thereof. Emulsifier can be used to further regulate the rheology of the coating. If so, preferred emulsifiers are soy lecithin and/or sunflower lecithin as they are perceived as cleaner label.

The invention also relates to a method of preparing a coating composition for frozen confection, said method comprises the steps of:

providing sugar, optional cocoa, and optional dairy ingredients and the fat according the inventions as described herein, melting the fat at least 10° C. above the melt point of the fat, mixing non-fat solids with the at least part of the melted fat and obtaining a mixture of fat and non-fat solids, refining the mixture of fat and non-fat solids by milling to reduce the particle size, preferably to a particle size to below 40 microns, adding remaining fat to the refined mixture and optionally adding emulsifier to the refined or non-refined mixture.

In an alternative process of the invention the non-fat solids can be pre-milled in a separate process-step (e.g. by the use of air-classifier mills). The pre-milling step can then fully or partly replace the refining of the mixture of hard fat and non-fat solids by milling to reduce the particle.

Furthermore, the frozen confection according to the invention may be an at least partly or fully coated products such as a stick or bar or morsel product.

The invention also relates to a method for producing a frozen confection, the method comprising providing a coating composition as described in this patent application and applying the method of preparation according to the invention described herein.

EXAMPLES

By way of example and not limitation, the following examples are illustrative of various embodiments of the present disclosure.

Fat Analysis:

Fats were analyzed based on standard methods; triglyceride composition using High Pressure Liquid Chromatography (HPLC), IUPAC method, 2.324; and fatty acid composition using Gas Chromatography, IUPAC method 2.304.

1. Fat Characteristics:

By way of example and not limitation, the following examples are illustrative of various embodiments of the present disclosure.

There are patents that mentioned the use of blends of fats for the use on the production of Low SFA Coatings for dipping. However, the use of these coatings increase the level of complexity in the manufacturing factories.

Hence, the need to find alternatives that allow the production of coatings for frozen products that only use one fat.

Fats with a low content of SFA compared with reference coconut oil were evaluated for their properties, solid fat content (SFC) and setting time. Three fats (table 1), all of which were palm fractions, and with SFA between 50-52% were initially chosen for evaluation.

The solid fat content was determined using pulsed NMR, using the American Oil Chemists Society, AOCS, Official Method Cd 16B-93, non-tempered. Standards from the company which had solids at 0, 29.4 and 70.1% were used to calibrate the equipment. Approximately 2 g of well melted fat was placed in a 10 mm NMR tube;

samples were then pre-treated prior to testing to make sure it is fully melted. The fats were not tempered, heated to 60° C., and analyzed. Samples were held at 30 min at various temperatures (0, 10, 20, 25, 30, 35, 37 and 40° C.), and the values at each temperature were read in the NMR. Samples were run in replicate, and the values were averaged.

Setting time was measured in the fats as described next. The samples were melted out (50° C.) and then quickly transferred to a temperature bath running at 0° C. Immediately on transfer, a stopwatch was started; this defines zero time. From there, the samples were tested by a conventional SFC measurement (probe temperature 20° C.). It should be remarked that the time at which a given SFC measurement is completed is displayed on the computer along with the SFC value itself. By noting the time on the stopwatch at which a given SFC value arrives (along with its time on the computer), it is possible to relate the 'computer times' to the length of time that the sample has been in the cold bath. The computer times were then converted to minutes in the cold bath. No correction was made for the length of time the SFC measurement itself takes (10 seconds), during which no more setting is taking place because the instrument is at 20° C. The setting time was taken to be the time to reach an SFC of 50%.

Figure 4:
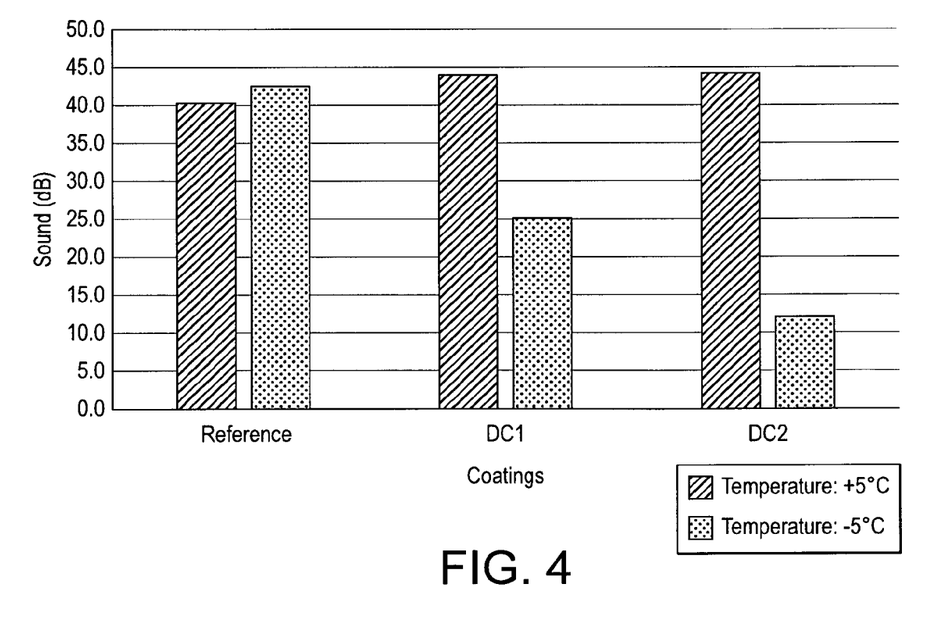
FIG. 4 shows Sound (dB) for Reference, DC1 and DC2 ice cream coatings measured by a Three-point bend test with acoustic event detection

Result—Fat properties:

FIG. 4 shows the Solid Fat Content (SFC) of fats at different temperatures

Figure 1:
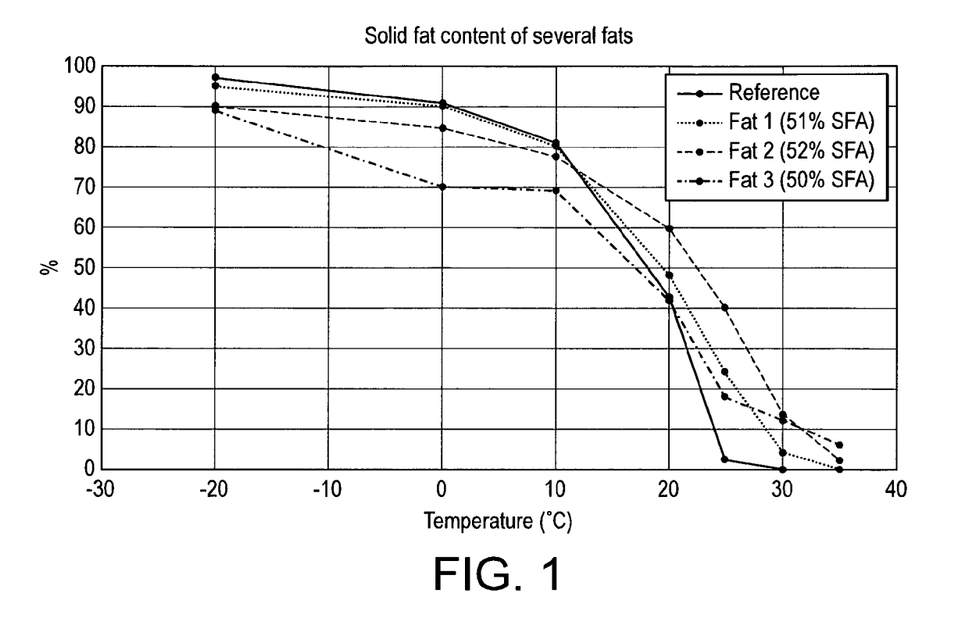
FIG. 1 shows the Solid Fat Content (SFC) of fats at different temperatures.

FIG. 1 shows the curves of the SFC of different fats with low SFA content against the reference (Coconut Oil). From the Figure it can be seen that Fat 1 has a SFC which is quite close to the reference at temperatures below 10° C. This is very important as the SFC in this temperature range will supply the structure required for snap to be present in the final ice cream coating when in contact with the ice cream. Fat 2 is comparable to the reference in SFC at 0 and 10° C., but Fat 3 has a lower SFC value at 0 and 10° C. and would not retain a snap when coated on an ice cream, especially during consumption FIG. 5 shows the setting time of fats measured by NMR FIG. 2. shows the results of the setting time of the lower SFA fats compared with the Reference—coconut oil. Here it can be seen that fat 3 takes 3 times longer to set. A long setting time will provoke that the coating drips longer and will be wet after dipping/enrobing which will produce issues on the factory lines, packaging problems and a very thin layer of coating on the ice cream stick and with that the presence of quality defects.

Considering these two results, Fat 3 was eliminated from further testing as it will be very soft at the moment of consumption (no/low snap), will not set on the processing line and may not deliver the desired pick-up weight.

Dipping coatings (DC) were made to the formulation as Table below:

| | Reference - 60% Fat | DC1 60% Fat | DC2 60% Fat |
|---|---|---|---|
| Fat type | Coconut Oil | Fat 1 | Fat 2 |
| Sugar | 28.4% | 28.4% | 28.4% |
| Cocoa Powder | 8.5% | 8.5% | 8.5% |

-continued

| | Reference - 60% Fat | DC1 60% Fat | DC2 60% Fat |
|---|---|---|---|
| Skimmed Milk Powder | 4% | 4.0% | 4.0% |
| Soy Lecithin | 0.5% | 0.5% | 0.5% |
| Target Particle Size [d 0.9] | 30 μm | | 30 μm |
| Equipment | | Buhler 3-Roll Refiner | |

The coating was manufactured using a 3 roll refiner system targeting a particle size of 30 microns.

As first step all the dry ingredients and part of the fat was added to a mixing tank at 45° C. and as soon as a homogenous mix was achieved the mix was refined using a bench scale 3 roll refiner. After the particle size was achieved the rest of the fat together with the lecithin were added and given an extra 10 minutes mixing. The final coating was discharged and sieved.

DC1 and DC2 Coatings have a similar content of SFA which is around 40% lower than the Reference coating.

Sensory Evaluation of Snap:

The samples were made with each coating using rectangular moulds (45 mm×90 mm×5 mm) by pouring 8 g of coating into each cell and setting the product at −30° C. for at least 30 minutes before de-moulding.

One day before the test, samples were placed to −18° C. freezer in sealed bags to have the product at conditions similar to a commercial storage. Test coatings were initially screened against reference by conducting the internal sensory snap analysis. Reference sample was evaluated every session and compared to the test coatings.

Figure 2:
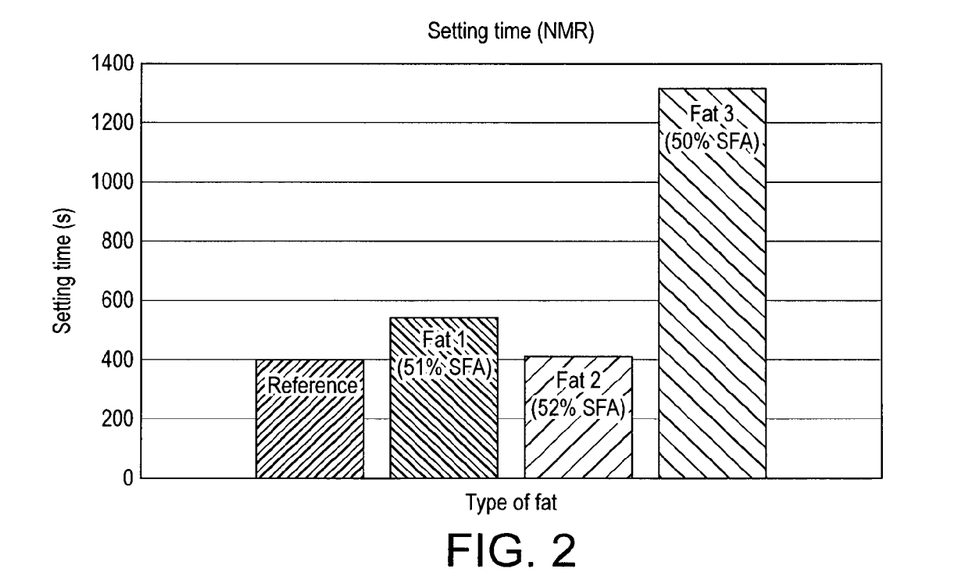
FIG. 2 shows the setting time of fats measured by NMR.
Figure 3:
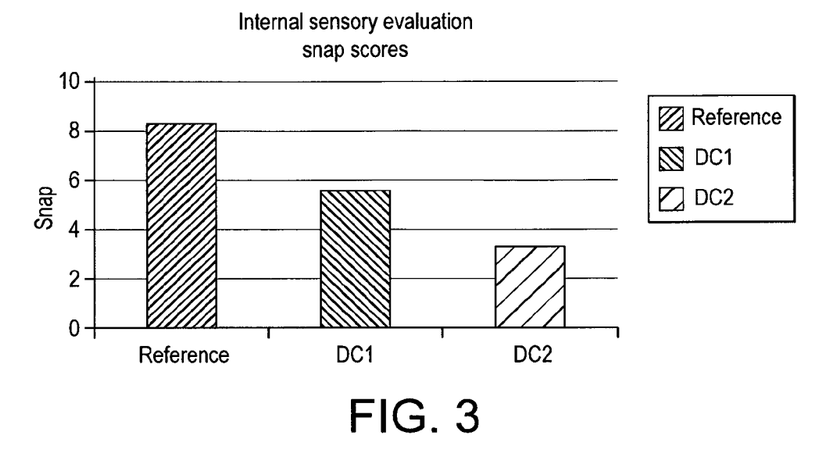
FIG. 3 Summary of all scores for the low SFA concept coatings assessed by the internal sensory test.

FIG. 2. shows the results of the internal sensory evaluation of the coatings. In conclusion, samples with Coating DC1 retained snap and was found acceptable, and coating DC2 samples were rejected due to low snap.

FIG. 6 Summary of all scores for the low SFA concept coatings assessed by the internal sensory test.

Instrumental Analysis Snap Method

Sample Preparation

The samples were made using rectangular moulds (45 mm×90 mm×5 mm, Picture 2.1) by pouring 13 g of coating and setting the product at −30° C. for at least 30 minutes before de-moulding. When samples were de-moulded, they were checked for a uniform thickness of 3.0-3.3 mm. Faulty samples were thrown away and re-made.

One day before the test, samples were placed to −5° C. and +5° C. set environmental chambers in sealed bags to have the product at conditions similar to a commercial storage.

Snap Analysis—Three-Point Bend Test

Three-point bend analysis is a method aimed at measuring breaking tendency of materials. Material is placed on two stands and is ruptured by a compression unit. In case of ice cream coatings, this test is carried out at two temperatures: −5 and +5° C. in order to determine if the coating loses its snap at higher temperature. The temperature is controlled by a thermal cabinet installed on a Texture analyser (TA-HD).

The sound produced by a sample rupture is recorded in this method. The microphone is attached to the wall of a thermal cabinet and connected to an Acoustic Envelope Detector (AED) unit which records the sound frequency at the moment of a sample break.

Sound (dB) are analysed by a Texture Analyser Macro software, then Sound is plotted against Distance. The −5° C. and +5° C. data points for all coatings are visually compared to the reference data and the closest ones are considered to be similar to the reference in terms of snap.

Results.

Figure below shows Sound (dB) for the reference, DC1 and DC2 coatings measured by three-point bend test at +5° C. and −5° C. In order to identify the samples most similar to the reference, the plotted points on the graph are compared visually. This is based on how closely they are to the reference data points at each temperature.

FIG. 4 shows Sound (dB) for Reference, DC1 and DC2 ice cream coatings measured by a Three-point bend test with acoustic event detection Based on the above observations DC1 coating for taken forward for making ice cream bar samples and tested for heat-shock test.

Coating Test on Ice Cream Sticks

The coating was maintained at 40° C. in a jacketed beaker and frozen sticks (−20 to −25° C.) were dipped into the coating. Dipped ice cream sticks were stored at −30° C. until the beginning of a Heat-Shock test.

Heat Shock Test

Heat Shock test is a heat treatment procedure applied to ice cream products in order to assess the impact of temperature fluctuations on textural and organoleptic properties of ice cream, coating and other product components.

Duration of the test was 2 weeks and consisted of 14 cycles. Each cycle contained two 11.5 h phases at 2 temperatures: −20° C. and −8° C., and a 30 minutes temperature transition period between each phase (below).

Summary of the Temperature Cycles for Low SFA Coatings Heat-Shock Test

TABLE

|  | Duration (hours) | Temperature (° C.) |
| --- | --- | --- |
| 1 Cycle | 11.5 | −20 |
| 24 h | 0.5 | −20 to −8 |
|  | 11.5 | −8 |
|  | 0.5 | −8 to −20 |

The Heat Shock test was carried out in Weiss environmental cabinets which was set-up at −20° C. one day prior to the start of experiment.

25 ice cream sticks of each type, Reference, and DC1, were moved from −30° C. freezer to the Weiss cabinet programmed to Heat-shock cycles for 2 weeks, and other 25 sticks were left at −30° C. freezer for storage in order to be used as Week 0 samples during sensory evaluation.

Heat Shock Test—Sensory Analysis

Samples were collected twice during the study, after every 7 cycles (in Weeks 1 and 2). The sticks were moved to −30° C. for storage and one day before the sensory evaluation they were moved to −18° C. freezer. Ice cream sticks were evaluated by internal panelists in two sessions.

1st Session: All Week 1 heat-shocked ice cream sticks were compared to Week 0 sticks, stored at −30° C.;

2nd Session: All Week 2 heat-shocked ice cream sticks were compared to Week 0 sticks, stored at −30° C.

The panelists were given sensory evaluation forms with specific coating attributes to be assessed using a qualitative scale. The assessed attributes focused on product appearance, flavor, snap and hardness of the coatings.

Results:

Week 1 vs. Time 0: Ice Cream Sticks Coated with the Coatings as Below

| Characteristic | Reference (coconut oil coating) | DC1 coating |
| --- | --- | --- |
| Coating Appearance | Similar. Both, T0 and after one week, present cracks | Similar to T0 |
| Snap (noise of the coating) | Similar | had more snap than at T0 |
| Hardness | Similar | Similar |

The most preferred and better preserved sample after 1 week of the heat shock analysis was DC1 coating. This coating was even mentioned to be snappier than a Time 0—DC1 sample. Moreover, this coating was stated to have the best appearance and less cracks compared to other coatings for both Week 0 and Week 1 coatings.

Week 2 vs Time 0: Ice Cream Sticks Coated with the Coatings as Below

| Characteristic | Reference (coconut oil coating) | DC1 coating |
| --- | --- | --- |
| Coating Appearance | Similar. Present cracks | Similar |
| Snap (noise of the coating) | Similar | had more snap than at T0 |
| Hardness | Similar | Was harder than at T0 |

After 2 weeks of heat-shock treatment sticks with DC1 coating was still had the snap and was preferred by the sensory panel, both products had good flavor release.

The fat used in DC1 coating is characterized by the triglyceride composition given in table below:

| Triglyceride | Fat 1 (Used in DC1 coating) Content [%] |
| --- | --- |
| LLL | 0.0 |
| OLL | 0.2 |
| PLL | 1.1 |
| OOL | 1.0 |
| POL | 5.9 |
| PPL | 9.5 |
| OOO | 2.8 |
| POO + SOL | 14.1 |
| PPO | 49.1 |
| PPP | 1.6 |
| SOO | 1.7 |
| PSO | 10.3 |
| PPS | 0.4 |
| SSO | 2.2 |
| LOL | 0.0 |
| SLL | 0.0 |
| OLO | 0.0 |
| LOO | 0.0 |
| SLO | 0.0 |
| SLS | 0.0 |
| Unidentified | 0.1 |

Fat 1 is a palm fraction with slip melting points of 29-30° C. and has saturated fatty acids, SFA content of 51%. The major fatty acids include Palmitic acid, 46%, stearic acid, 5%, oleic acid, 36.6% and linoleic, 6.4%.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended

The invention claimed is:

1. A dipping or enrobing coating composition for coating frozen confection, the dipping or enrobing coating composition comprising, expressed in weight %,
   30-75 wt. % of a single fat, the single fat comprising the following fatty acids:
   45<=C16:0<=52 wt. % (palmitic acid);
   4<=C18:0<=8 wt. % (stearic acid);
   30<=C18:1<=40 wt. % (oleic acid); and
   5<=C18:2<=10 wt. % (linoleic acid),
   and the single fat comprises a solid fat profile comprising:
   88%<=N 0<=95%;
   75%<=N 10<=90%;
   40%<=N 20<=60%;
   18%<=N 25<=35%;
   0%<=N 30<=10%; and
   0%<N 35,
   wherein saturated fats in the single fat are 45-55 wt. % of the single fat in the dipping or enrobing coating composition, the dipping or enrobing coating composition has a Casson yield stress of 0.05 to 0.9 Pa and a Casson plastic viscosity of 50 to 250 mPas, and the single fat has a setting time less than 150% of a setting time of coconut oil at the same test conditions.

2. The dipping or enrobing coating composition according to claim 1, wherein the single fat further comprises the following triglyceride composition:
   <0.5% LLL;
   <1% OLL;
   0-2 wt. % PLL;
   0-2 wt. % OOL;
   3-7 wt. % POL;
   6-15 wt. % PPL;
   0-4 wt. % OOO
   8-17 wt. % POO+SOL;
   45-58 wt. % PPO;
   0-3 wt. % PPP;
   0-3 wt. % SOO;
   5-15 wt. % PSO;
   <1 wt. % PPS; and
   0-3 wt. % SSO.

3. The dipping or enrobing coating composition according to claim 2, wherein the triglyceride composition comprises 10 to 17 wt. % POO+SOL and 48 to 55 wt. % PPO.

4. The dipping or enrobing coating composition according to claim 1, comprising:
   18 to 60 wt. % of sugar;
   0 to 25 wt. % cocoa ingredient; and
   0 to 30 wt. % of dairy ingredients.

5. The dipping or enrobing coating composition according to claim 1, wherein viscosity of the single fat is 37 to 40 mPas Measured at 40° C.

6. The dipping or enrobing coating composition according to claim 1, wherein the dipping or enrobing coating composition has a melting point of 29 to 34° C.

7. The dipping or enrobing coating composition according to claim 1, wherein the saturated fats in the single fat are 48-52 wt. % of the single fat in the dipping or enrobing coating composition.

8. The dipping or enrobing coating composition according to claim 1, comprising palm fraction or fractions with an iodine value of 40 to 50.

9. The dipping or enrobing coating composition according to claim 1, wherein the single fat in the dipping or enrobing coating composition consists of palm fraction or fractions.

10. The dipping or enrobing coating composition according to claim 1, wherein the dipping or enrobing coating composition comprises 48 to 58 wt. % of fat, and the dipping or enrobing coating composition has a yield stress of 0.1 to 0.8 Pa and a viscosity of 100 to 200 mPa·s.

11. The dipping or enrobing coating composition according to claim 1, wherein the dipping or enrobing coating composition comprises 58 to 70 wt. % of fat, and the coating composition has a yield stress of 0.05 to 0.5 Pa and a viscosity of 50 to 150 mPa·s.

12. A method for dipping, enrobing or decoration of frozen confection, the method comprising dipping, enrobing, or coating a frozen confection with a single fat comprising the following fatty acids to form a coating on the frozen confection:
    45<=C16:0<=52 wt. % (palmitic acid);
    4<=C18:0<=8 wt. % (stearic acid);
    30<=C18:1<=40 wt. % (oleic acid); and
    5<=C18:2<=10 wt. % (linoleic acid);
    and the single fat comprises a solid fat profile comprising:
    88%<=N 0<=95%;
    75%<=N 10<=90%;
    40%<=N 20<=60%;
    18%<=N 25<=35%;
    0%<=N 30<=10%; and
    0%<N 35,
    wherein saturated fats in the fat are 45-55 wt. % of the single fat, the coating has a Casson yield stress of 0.05 to 0.9 Pa and a Casson plastic viscosity of 50 to 250 mPas, and the single fat has a setting time less than 150% of a setting time of coconut oil at the same test conditions.

13. The method according to claim 12 wherein the fat further comprises the following triglyceride composition:
    <0.5% LLL;
    <1% OLL;
    0-2 wt. % PLL;
    0-2 wt. % OOL;
    3-7 wt. % POL;
    6-15 wt. % PPL;
    0-4 wt. % OOO;
    8-17 wt. % POO+SOL;
    45-58 wt. % PPO;
    0-3 wt. % PPP;
    0-3 wt. % SOO;
    5-15 wt. % PSO;
    <1 wt. % PPS; and
    0-3 wt. % SSO.

14. A method of preparing a coating composition for frozen confection, the method comprising:
    providing sugar and a single fat comprising the following fatty acids: 45<=C16:0<=52 wt. % (palmitic acid); 4<=C18:0<=8 wt. % (stearic acid); 30<=C18:1<=40 wt. % (oleic acid); and 5<=C18:2<=10 wt. % (linoleic acid), and the single fat comprises a solid fat profile comprising: 88%<=N 0<=95%; 75%<=N 10<=90%; 40%<=N 20<=60%; 18%<=N 25<=35%; 0%<=N 30<=10%; and 0%<N 35, wherein saturated fats in the single fat are 45-55 wt. % of the single fat in the coating composition, and the single fat has a setting time less than 150% of a setting time of coconut oil at the same test conditions;
    melting the single fat at a temperature at least 10° C. above the melt point of the single fat;

mixing non-fat solids with the at least part of the melted fat and obtaining a mixture of fat and non-fat solids;

refining the mixture of fat and non-fat solids by milling to reduce the particle size; and adding remaining fat to the refined mixture.

15. The method according to claim 14 comprising adding an emulsifier to the refined or non-refined mixture.

16. The method according to claim 14, wherein the method comprises reducing the particle size to be less than 50 microns.

17. The method according to claim 14, wherein the method comprises reducing the particle size to be less than 40 microns.

18. The dipping or enrobing coating composition according to claim 1, wherein the dipping or enrobing coating composition includes particles having particle size less than 50 microns.

19. The method according to claim 12, wherein the coating includes particles having particle size less than 50 microns.

20. The method according to claim 12, wherein the coating includes particles having particle size less than 40 microns.

\* \* \* \* \*